United States Patent Office 3,030,810
Patented Apr. 24, 1962

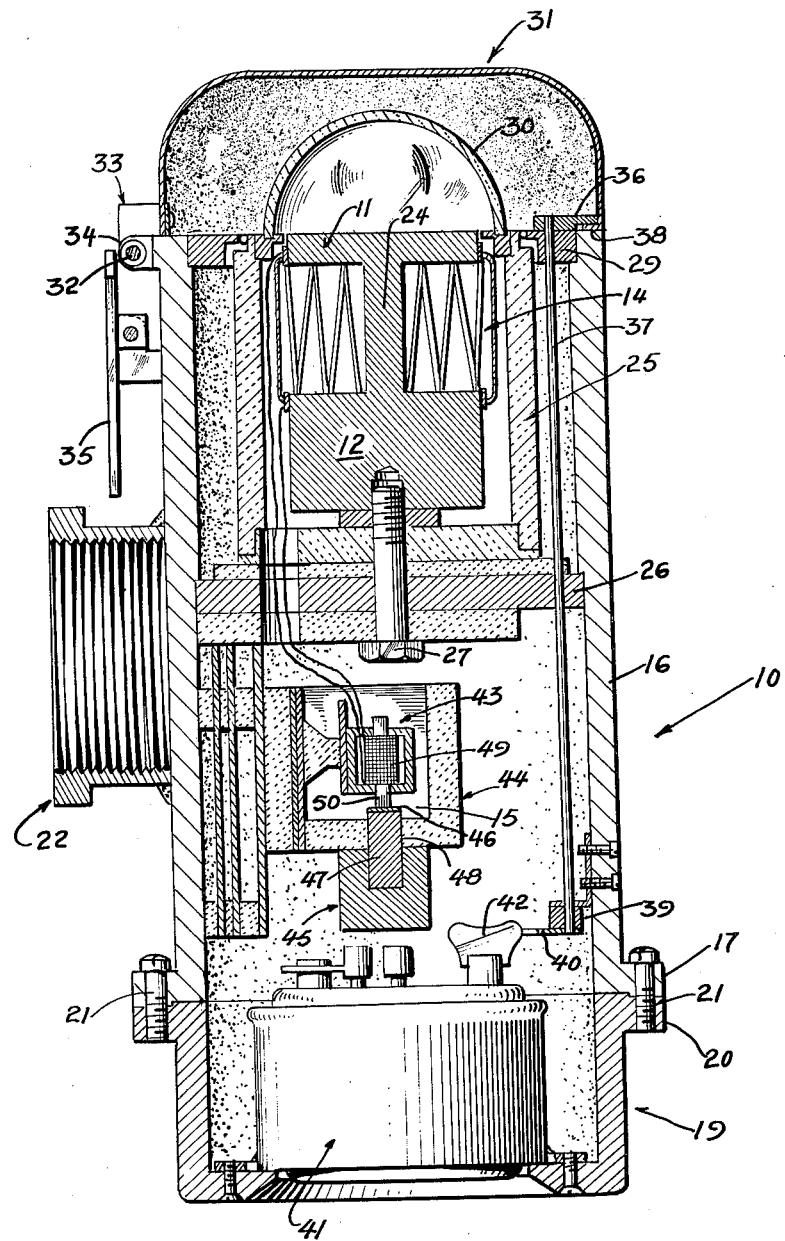

3,030,810
RADIANT HEAT ENERGY PULSE RECORDER
James J. Byrnes, Jericho, and Philip Miller, East Norwich, N.Y., assignors to Associated Nucleonics, Inc., a corporation of New York
Filed Aug. 5, 1955, Ser. No. 526,734
6 Claims. (Cl. 73—355)

The present invention relates to radiant heat energy recording instruments, and, more particularly, to an instrument for recording the radiant heat energy pulse emitted by an atomic bomb explosion from which the peak or maximum energy value at a given moment can be determined.

In conducting atomic bomb explosion tests, it is essential to measure the radiant heat energy of the bomb at various points within the area surrounding the location at which the explosion takes place, whereby the effectiveness of the bomb in intensity and range can be determined.

Heretofore, instrumentation has been available for making such determinations which measured the radiant heat energy by absorbing the same in a block, sensing the resultant change in temperature of the block, and causing a galvanometer actuated pen-type recorder to make a record of the temperature changes so sensed.

Such recorders utilize moving parts and hence are subject to error or damage when exposed to the shock waves from the explosion which accompany the radiant energy pulse. To avoid such error or damage, elaborate precautions are necessary, such as, burying the recorder in the ground or shock mounting the same. In addition, such recorders require a source of power to operate the same.

Accordingly, an object of the present invention is to provide an instrument which integrates the energy of the pulse and records the maximum value of the integral.

Another object is to provide such a recorder in which no moving parts are utilized in the sensing and recording circuit and no source of power is required to operate the same.

Another object is to provide such an instrument wherein the magnitude of the recorded pulse can thereafter be readily determined by conventional means.

Another object is to provide such an instrument which discriminates against ambient temperature changes.

Another object is to provide such an instrument which is protected against atmospheric conditions prior to the time an explosion is scheduled and which is protected against debris after the explosion has taken place.

A further object is to provide such a recorder which is simple, practical and economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a radiant heat energy recorder which comprises the combination of a heat absorber, a heat sink, a thermopile coupled between the heat absorber and the heat sink, and magnetic recording means in electrical connection with the thermopile.

A preferred embodiment of the invention has been chosen for purposes of illustration and description, and is shown in the accompanying drawing, forming a part of the specification, wherein:

The single view is a longitudinal sectional view of a radiant heat energy recorder illustrating the present invention.

Referring to the drawing in detail, a radiant heat energy recorder is shown which essentially comprises a casing 10, a heat absorber 11, a heat sink 12, a sensitive thermopile 14 thermoconductively coupled between the heat absorber and the heat sink but electrically insulated thereform, and magnetic recording means 15 in electrical connection with the thermopile.

The casing 10 comprises a tubular body section 16, such as a length of heavy iron or steel pipe or tubing, having a flange 17 at its lower end, a closure 19 formed with a flange 20 adapted for removable securement to the flange 17 by bolts or screws 21, and a laterally extending threaded bushing or cup 22 welded to the casing body section at the side thereof for attaching the recorder to a support (not shown) adapted to be anchored in the ground.

The heat absorber 11 is in the form of a metallic disc located in the upper end of the casing body and having its upper surface blackened to increase its heat absorbing properties. The heat sink 12 is located beneath the heat absorber disc but is spaced therefrom to facilitate coupling the same to the heat absorber by the thermopile 14 as shown. The heat sink is a metallic block of larger mass than the disc and is shielded from heat radiations, whereby the thermopile senses the temperature difference between the disc and the block and generates an electrical current.

In order to minimize differences in temperature between the heat absorber disc and the heat sink block due to changes in ambient temperatures, a heat leak means 24 is connected between the disc and the block. This means may be a metallic rod-like element of a cross-sectional area to provide sufficient heat leakage for equalizing the temperature of the disc and the block as the ambient temperature changes, whereby the thermopile will not generate any current or any current generated is of a negligible value.

The present invention simplifies the arrangement of the foregoing elements by constructing the disc, the rod-like element and the block in one piece, whereby, when the thermopile is secured as shown, a sensing unit is provided which is readily assembled in the casing body. This unit is shielded by heat insulating elements 25 indicated by appropriate cross-hatching and is mounted, together with the insulation, on a transverse partition 26 within the casing body and is secured thereto by a bolt or screw 27. A ring 29 in the casing body at its upper end surrounds the upper end of the tubular insulating element to provide further support for this unit.

In order to prevent dirt, debris or radioactive particles from being deposited directly on the upper surface of the heat absorber disc, a dome-like transparent shield 30 encloses the upper end of the heat absorber as shown. This shield preferably is made of quartz which is permeable to radiations in the range from about 2,000 to about 30,000 angstroms.

The shield and the open end of the casing body are further protected from the elements by a cover 31 which normally is in its closed position as shown, but is adapted to be opened just prior to the time the explosion is set off. To accomplish this, the cover is hinged at 32, a spring 34 tends to urge the cover into its opened position by engaging the lug 33 on the cover, a clip 35 retains the cover in its open position, and a latch element 36 engages a tab 38 on the cover to retain the cover in its closed position until rendered ineffective by timing mechanism about to be described.

Such mechanism comprises a rod 37 having the latch element 36 mounted on its upper end for rotation therewith, which rod is rotatably supported by the ring 29, the partition 26 and a bracket 39 adjacent the lower end of the casing body; an arm 40 secured to the lower end of the rod for rotating the same; and an alarm clock 41 secured within the casing closure having its alarm operating spring wind-up key 42 so located that it will actuate the arm 40 to rotate the rod 37 and render the latch element ineffective as the alarm spring unwinds and causes the key 42 to turn in the course of the clock alarm being operated, whereby the clock can be set to provide such actuation a short time prior to the explosion.

The recording means 15 are suitably supported between the partition 26 and the clock 41 by an insulating bracket 44. The recording means include a conventional magnetic recording head 43, for example of the ring-type, and a block 45 removably attached to the bracket for mounting a short length of magnetic tape 46. As illustrated herein, the block 45 has a rectangular projection 47 on which the tape is fastened and which is frictionally fitted into a slot 48 formed on the bracket 44. The head 43 comprises a coil 49 in electrical connection, in series, with the thermopile 14 and an element 50 in contact with the tape 46 which is actuated by the coil when current is generated by the thermopile, whereby magnetization is induced in the strip of magnetic tape.

The apparatus is arranged for operation by removing the closure 19, withdrawing the tape mounting block 45, fastening the tape 46 thereon and reinserting it into the slot 48, closing the cover 31 and turning the arm 40 to cause the latch element to retain the cover in closed position, winding the clock 41, setting the alarm to go off at the desired time with the key 42 positioned out of engagement with the arm 40, and replacing the closure. The apparatus is then secured to its mounting means (not shown) and is ready for operation.

In operation, the alarm goes off a short period prior to the time the blast is to take place, and, as the key 42 rotates, it engages the arm 40 to turn it aside and thereby rotate the rod 37 to render the cover retaining latch element ineffective. Thereupon, the spring 34 opens the cover and swings it back to move the lug 33 into engagement with the clip 35 which retains the same in a position, whereby the dome 30 is fully exposed.

As the blast takes place, the radiant energy from the explosion will reach the apparatus over a period of about three seconds and is absorbed on the blackened upper surface of the disc 11. As a result, the temperature of the disc rises by an amount depending on the amount of heat energy reaching it. The thermopile 14 senses the temperature difference between the heat absorber disc 11 and the heat sink block 12, and generates an electrical current at a voltage which depends on the temperature difference. The generated current operates the magnetic head to impress a signal on the strip of magnetic tape 46.

After conditions permit, the closure 19 is again removed and the tape strip 46 is removed and taken to a testing station where the magnitude of the magnetization induced in the tape can then be determined by conventional means.

The apparatus in accordance with the present invention differs from conventional recorders in that it is only concerned with sensing a peak intensity rather than a continuous record. Such a continuous record is unnecessary because the instrument responds to relatively rapid changes in radiation intensity but ignores gradual heat changes, even though the cumulative heating effect of solar radiation is comparable to that of the nuclear radiation. This discrimination is obtained by providing a path of known thermal conductivity over which heat can leak from the heat absorber disc to the heat sink block of larger heat capacity. The heat leakage path is large enough so that solar radiation can raise the temperature of the disc by only a small value above that of the block. At the same time, the heat leakage is sufficiently small so that the amount of heat leakage during the period of the radiant heat energy pulse sought to be detected is but a small fraction of the total heat pulse.

While the present invention is described in connection with recording the radiant heat energy pulse emitted by an atomic bomb explosion, by way of example, it is apparent that the present invention has utility in testing atomic energy utilized for other purposes than weapons. The apparatus described herein could be utilized for industrial instrumentation where only total energy pulse need be recorded instead of utilizing apparatus such as shown in U.S. Patents 2,562,538 and 2,601,508. The apparatus could also be used for recording the total energy pulse of large search lights, or bursts of flame produced by magnesium or fuel explosions.

From the foregoing description, it will be seen that the present invention provides a radiant heat energy pulse recorder which is simple, practical and economical in construction, and is accurate and reliable in operation, but yet is capable of withstanding the rough usage to which it may normally be subjected.

As various changes may be made in the form, construction and arrangement of the parts herein without departing from the spirit and scope of the invention and without sacrificing any of its advantages, it is to be understood that all matter herein is to be interpreted as illustrative and not in any limiting sense.

We claim:

1. A recorder for measuring pulses of radiant heat energy of finite and short duration, comprising in combination, a heat absorber, a heat sink of larger mass than said heat absorber and spaced therefrom, a thermopile coupled between said heat absorber and said heat sink to respond to a temperature differential, a heat leak element thermally coupled between said heat absorber and said heat sink to provide heat conduction between them, the thermal conductivity of said heat leak element being large enough so that the temperature differential produced between the heat absorber and the heat sink by solar radiation impinging upon the former is small as compared with the temperature differential produced by a pulse of radiant energy being measured, the thermal conductivity of said heat leak element however being small enough so that the heat leakage during the period of the radiant heat energy pulse is but a small fraction of the total heat pulse, and means in electrical connection with said thermopile for recording the peak response of said thermopile including a recording head having a magnetization inducing element and means for mounting a strip of magnetic tape in magnetizing relation to said magnetization inducing element.

2. In a radiant heat energy pulse recorder the combination of a casing having an open upper end, a cover for closing said open upper end, mechanism for causing said cover to unclose the open end of said casing, a heat absorber positioned in said casing adjacent said upper end and adapted to be exposed to radiant heat energy to be detected when said cover is unclosed, a heat sink in said casing beneath said heat absorber, a thermopile coupled between said heat absorber and said heat sink to respond to differential temperature therebetween caused by radiant heat energy pulses of short duration impinging upon said absorber, heat leak means providing heat conduction between said heat absorber and said heat sink to minimize the temperature differential therebetween resulting from gradual changes in the radiant heat energy impinging upon said heat absorber, thereby rendering said thermopile substantially nonresponsive to said gradual changes in radiant heat energy, a magnetic recording head in said casing in electrical connection with said thermopile, and timing means for rendering said cover actuating mechanism effective.

3. A recorder according to claim 2, wherein said casing cover is hinged and is provided with spring means for normally unclosing the same, and said mechanism includes a latch for retaining said cover in its closed position and means operable by said timing means to render said latch ineffective.

4. A radiant heat energy pulse recorder comprising a casing having an open upper end, a heat absorber in said casing adjacent said upper end, a heat sink in said casing beneath said heat absorber, heat leak means between said heat absorber and said heat sink, a thermopile coupled between said heat absorber and said heat sink, a magnetic recording head in said casing beneath said heat sink and in electrical connection with said thermopile, and means for supporting a strip of magnetic tape in contact with the actuated element of said recording head.

5. A recorder according to claim 4, including a transparent shield for enclosing the upper end of said heat absorber, a cover hinged on said casing for closing the open end of said casing, a spring for normally causing said cover to unclose said open end, a latch for retaining said cover in its closed position, timing means in the lower end of said casing, and means operable by said timing means to render said latch ineffective.

6. A recorder according to claim 5, wherein said casing has an open lower end, and includes a closure for supporting said timing means removably secured to said casing to close said lower open end, whereby, upon removal of said last mentioned closure, said timing means and said means operable by said timing means to render said latch ineffective can be set.

References Cited in the file of this patent

UNITED STATES PATENTS

| | | |
|---|---|---|
| 1,031,076 | Lusted | July 2, 1912 |
| 1,837,222 | Kannenstine | Dec. 22, 1931 |
| 1,988,858 | Quereau | Jan. 22, 1935 |
| 2,182,632 | Kiernan | Dec. 5, 1939 |
| 2,382,609 | Dale | Aug. 14, 1945 |
| 2,562,538 | Dyer | July 31, 1951 |
| 2,601,508 | Fastie | June 24, 1952 |
| 2,660,800 | Wiley | Dec. 1, 1953 |
| 2,799,946 | Mayes | July 23, 1957 |